United States Patent
Chung et al.

(10) Patent No.: US 7,495,723 B2
(45) Date of Patent: Feb. 24, 2009

(54) LED ARRAY

(75) Inventors: Feng-Chien Chung, Tainan County (TW); Shen-Yin Tsai, Tainan County (TW); I-Chang Lee, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 397 days.

(21) Appl. No.: 11/362,752

(22) Filed: Feb. 28, 2006

(65) Prior Publication Data
US 2007/0103054 A1 May 10, 2007

(30) Foreign Application Priority Data
Nov. 10, 2005 (TW) .............................. 94139477 A

(51) Int. Cl.
G09G 5/02 (2006.01)
G09G 3/32 (2006.01)
G09G 3/20 (2006.01)
H05B 33/00 (2006.01)

(52) U.S. Cl. ................. 349/108; 349/104; 349/106; 348/790; 313/498

(58) Field of Classification Search ............... None
See application file for complete search history.

(56) References Cited

U.S. PATENT DOCUMENTS

| | | | | |
|---|---|---|---|---|
| 4,800,375 A | * | 1/1989 | Silverstein et al. | 345/694 |
| 6,023,315 A | * | 2/2000 | Harrold et al. | 349/108 |
| 6,570,584 B1 | * | 5/2003 | Cok et al. | 345/690 |
| 6,791,636 B2 | | 9/2004 | Paolini et al. | |
| 6,980,176 B2 | * | 12/2005 | Matsumoto et al. | 345/6 |

FOREIGN PATENT DOCUMENTS

TW 239108 9/2005

* cited by examiner

Primary Examiner—Ashok Patel
(74) Attorney, Agent, or Firm—Bacon & Thomas, PLLC

(57) ABSTRACT

An LED array includes a plurality of first and second light-emitting rows. Each of the first light-emitting rows is composed of a plurality of red and green LEDs arranged linearly alternately. Each of the second light-emitting rows is composed of a plurality of green and blue LEDs arranged linearly alternately. The first and second light-emitting rows are parallel to each other and arranged alternately. Thus, the LED array can generate preferably equable arrangement of colored light to output preferably equable light mixture. In any 2×2 matrix, there are two green, one red, and one blue LEDs.

8 Claims, 6 Drawing Sheets

LED ARRAY

BACKGROUND OF THE INVENTION

1. Field of the Invention

The present invention relates generally to light emitting diode (LED) arrays for light mixture, and more particularly, to an LED array capable of equable colored light mixture.

2. Description of the Related Art

Referring to FIG. 5, U.S. Pat. No. 6,791,636 disclosed a conventional backlight module composed of a plurality of red, green, and blue LEDs arranged in a predetermined sequence. In FIG. 5, it shows that rows of green, red, blue, and green LEDs are arranged in sequence from the left side to the right side to emit RGB light and then the RGB is mixed to output a white light source. However, such conventional backlight module is defective because the overall rows of green, red, or blue light after the mixture are subject to influence of the whole row of the homogeneous light to generate a plurality of colored light, which output enables the user to be implicitly aware of the colored light straps, incurring worse light mixture.

Referring to FIG. 6, Taiwan Patent No. I239108 disclosed an LED array and upright-down backlight module, which changed the arrangement indicated above to arrange the red, green, and blue LEDs in another way to eliminate the colored light straps potentially incurred. Although such module improves the drawback of the above-mentioned U.S. patent, it is still defective to require improvement because two adjacent green LEDs are located cornerwise to generate diagonal green light strap.

SUMMARY OF THE INVENTION

The primary objective of the present invention is to provide an LED array, which light mixture is preferably equable to effectively avoid generation of colored light straps.

The secondary objective of the present invention is to provide an LED array, which includes two green, one red, and one blue LEDs at any 2×2 matrix, wherein the two green LEDs are located cornerwise.

The foregoing objectives of the present invention are attained by the LED array, which includes a plurality of first and second light-emitting rows. Each of the first light-emitting rows is composed of a plurality of red and green LEDs arranged linearly alternately. Each of the second light-emitting rows is composed of a plurality of green and blue LEDs arranged linearly alternately. The first and second light-emitting rows are parallel to each other and arranged alternately.

The LED array can generate preferably equable arrangement of colored light to output preferably equable light mixture. In any 2×2 matrix, there are two green, one red, and one blue LEDs, and the two green LEDs are located cornerwise.

Alternatively, there are two adjacent light-emitting rows (red-green and green-red), and a plurality of blue LEDs are inserted into the two light-emitting rows such that each 2×2 matrix having blue LEDs includes two green, two red, and one blue LEDs, thus effecting preferably equable colored light mixture.

DETAILED DESCRIPTION OF PREFERRED EMBODIMENTS

Figure 1:
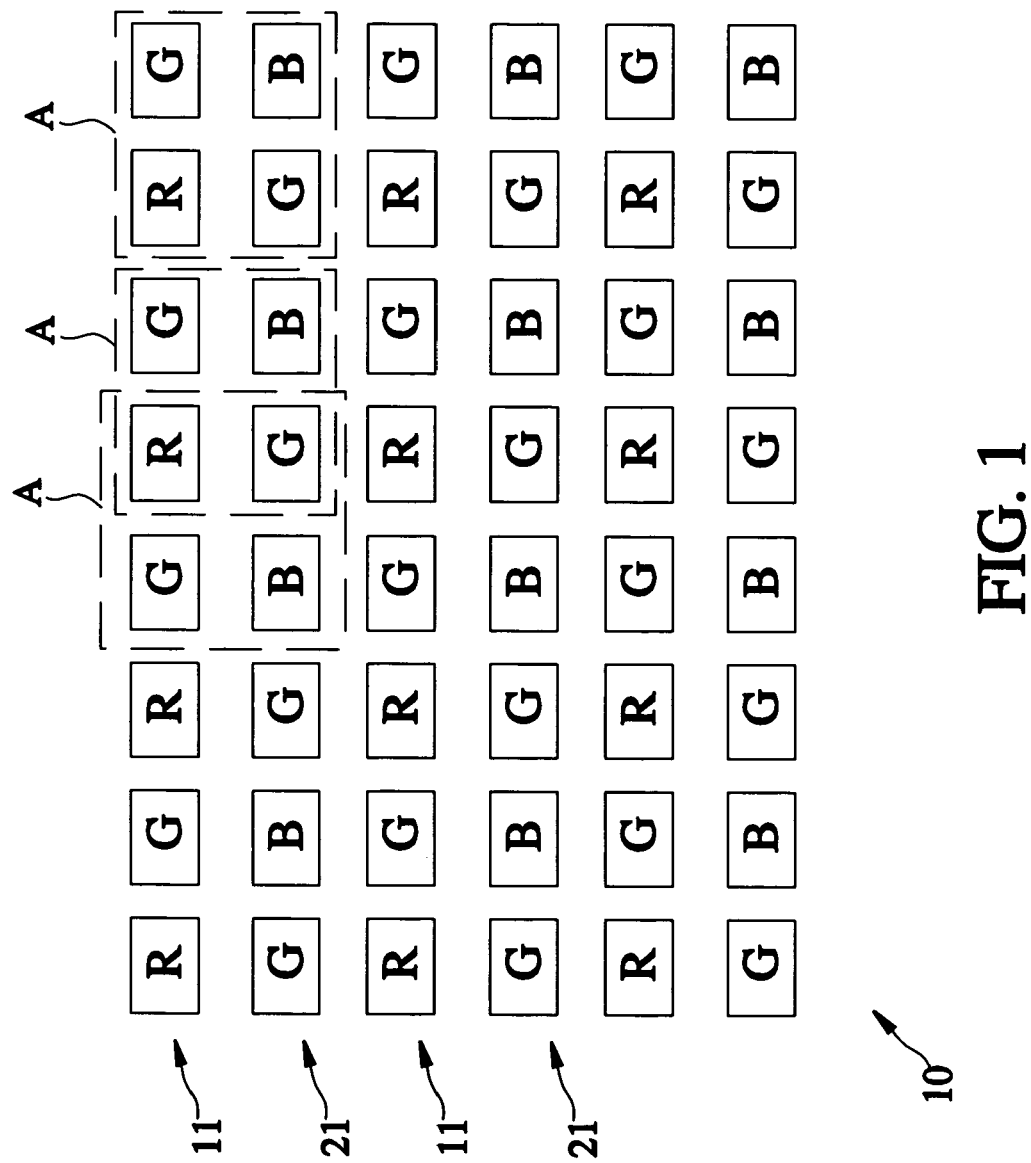
FIG. 1 is a schematic view of a first preferred embodiment of the present invention.
Figure 2:
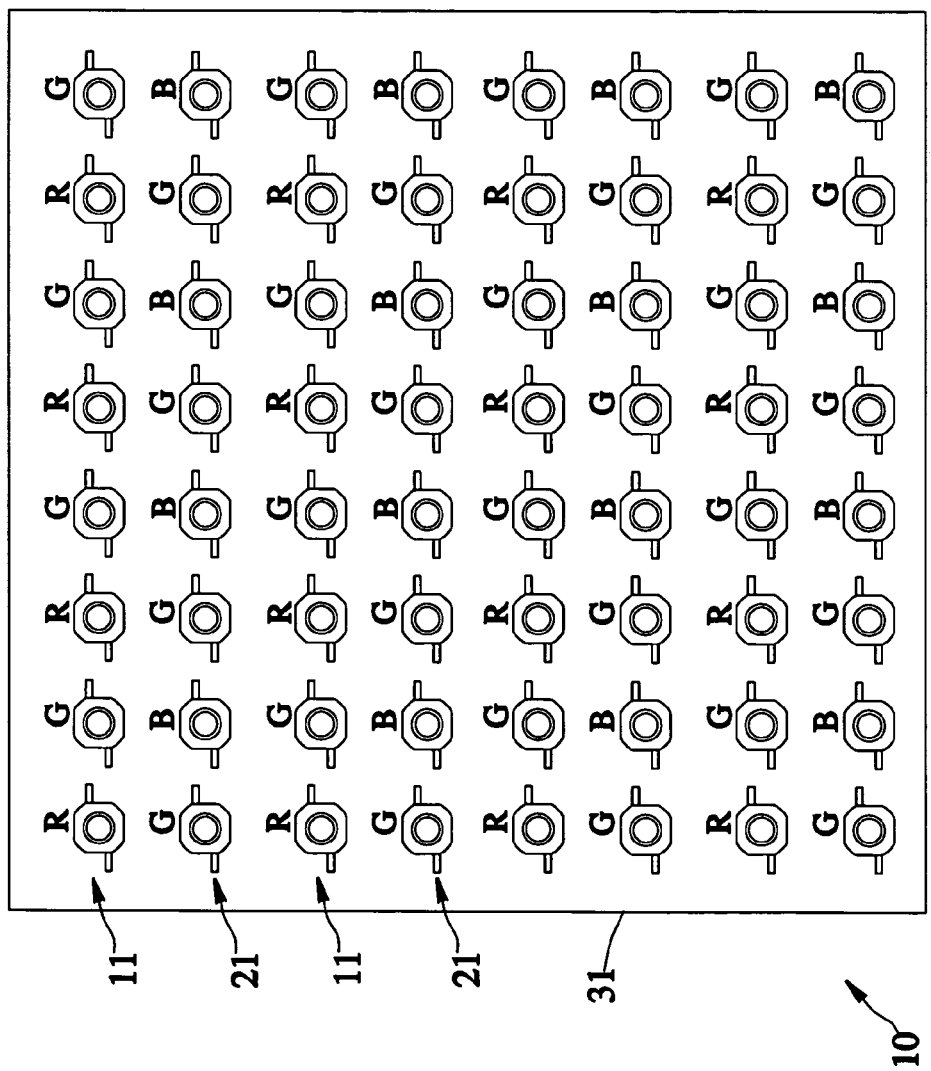
FIG. 2 is a schematic view of the first preferred embodiment of the present invention applied to a quadrangular plate.

Referring to FIGS. 1-2, an LED array 10 constructed according to a first embodiment of the present invention is composed of a plurality of first light-emitting rows 11 and second light emitting rows 21.

The first light-emitting rows 11 are composed of a plurality of red LEDs R and green LEDs G. The red and green LEDs R and G are linearly alternately arranged. The second light-emitting rows 21 are composed of a plurality of green LEDs G and blue LEDs B. The green and blue LEDs G and B are linearly alternately arranged.

The first and second light-emitting rows 11 and 21 are parallel to each other and arranged alternately. Between each adjacent first and second light-emitting rows 11 and 21, the green LEDs G of the first light-emitting row 11 are adjacent to the blue LEDs B of the second light-emitting row 12 respectively.

FIG. 1 shows the arrangement of the present invention. FIG. 2 shows that a plurality of LEDs are mounted on a quadrangular plate 31.

As shown in FIG. 1, two green LEDs G, one blue LEDs B, and one red LEDs R are provided in any 2×2 matrix A to be equably mixed to generate white light. The green LEDs G in each matrix A are located cornerwise. All of the green LEDs G are arranged like a mesh to be disposed equably and thus to effectively avoid generation of the colored light straps as incurred in the prior art.

Figure 3:
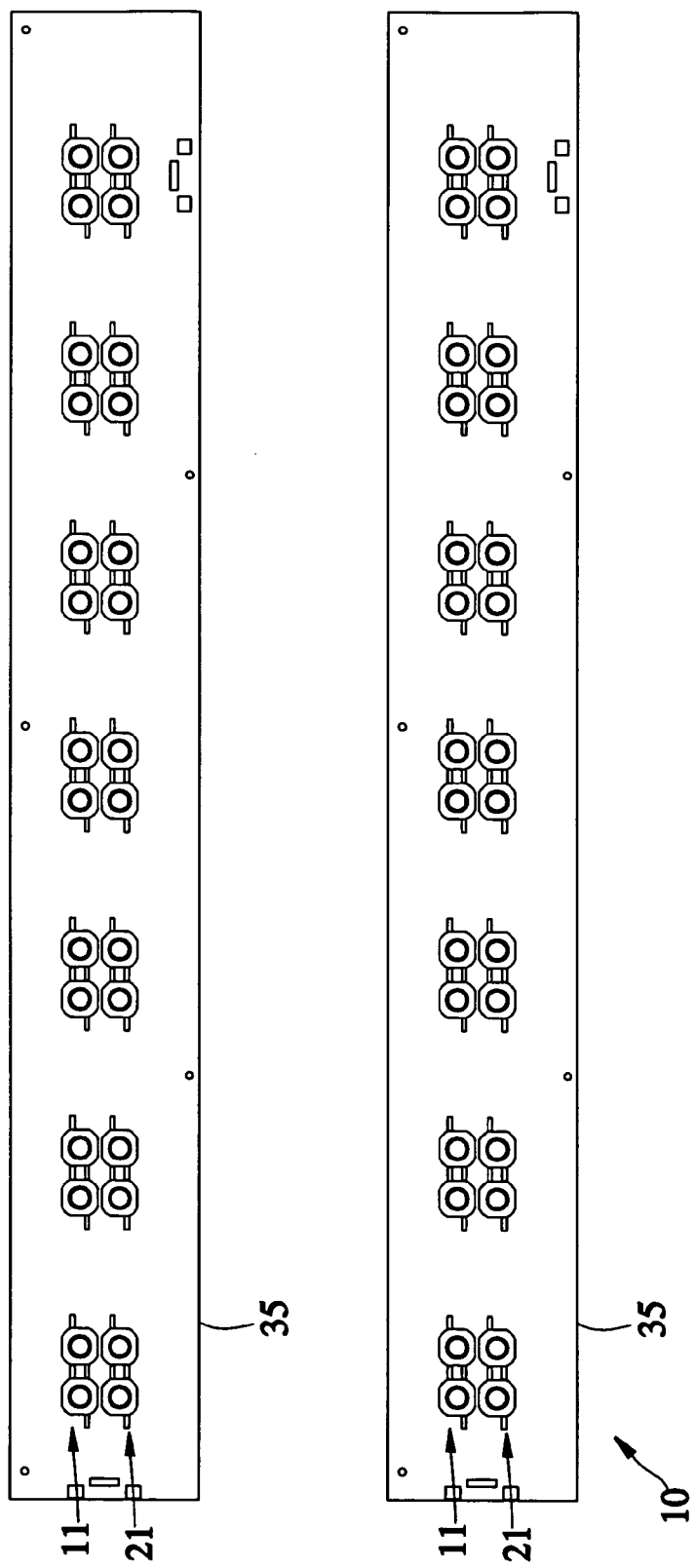
FIG. 3 is a schematic view of the first preferred embodiment of the present invention applied to a quadrangular circuit board.

In addition to the quadrangular plate 31, as shown in FIG. 3, the LEDs of the first and second light-emitting rows 11 and 21 can be alternatively mounted on a plurality of quadrangular circuit boards 35, each of which has one first light-emitting row 11 and one second light-emitting row 21 both mounted thereon, wherein the first light-emitting row 11 is adjacent to the second light-emitting row 21. Each two of the LEDs of the first light-emitting row 11 are closely arranged in pair, and each pair of the LEDs is spaced from the other in a predetermined interval. Each two of the LEDs of the second light-emitting row 21 are closely arranged in pair, and each pair of the LEDs is spaced from the other in a predetermined interval. Each pair of the LEDs of the first light-emitting row 11 and each pair of the LEDs of the second light-emitting row 21 together form a 2×2 matrix. The circuit boards 35 are arranged in array to effect the light mixture shown in FIG. 1.

Figure 4:
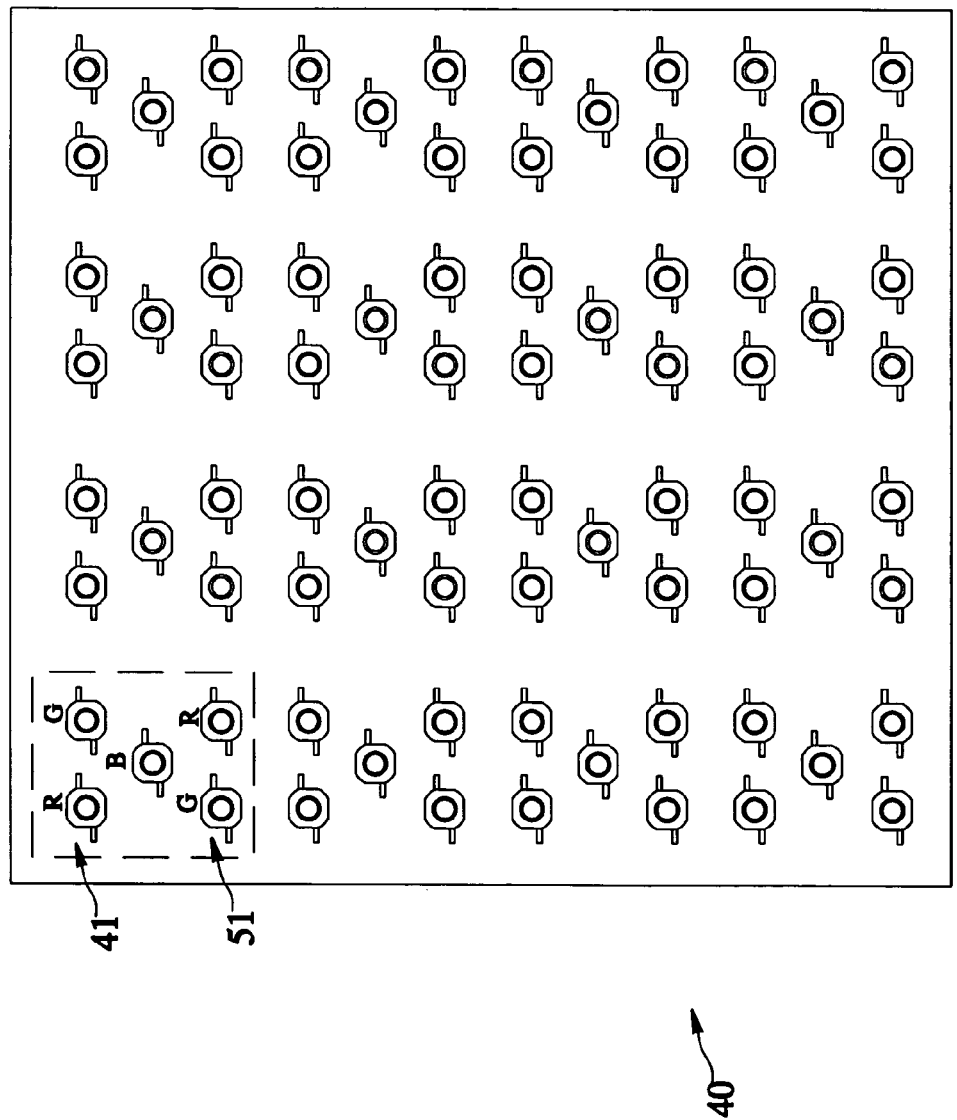
FIG. 4 is a schematic view of a second preferred embodiment of the present invention.
Figure 5:
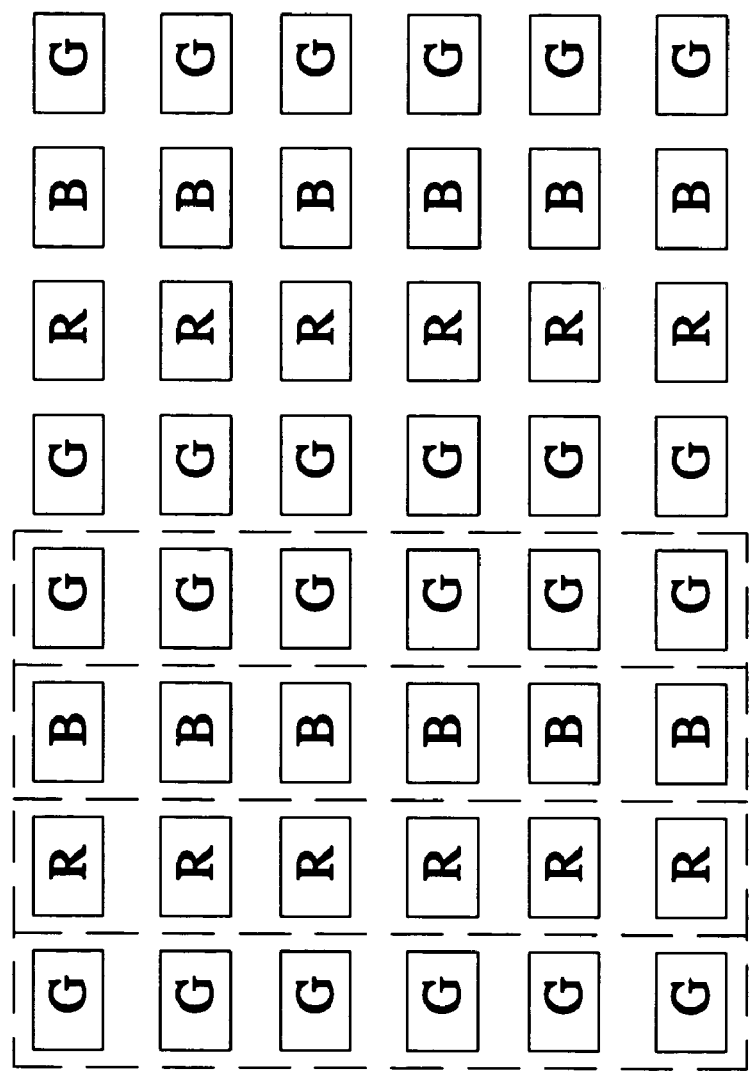
FIG. 5 is a schematic view of a conventional backlight module.
Figure 6:
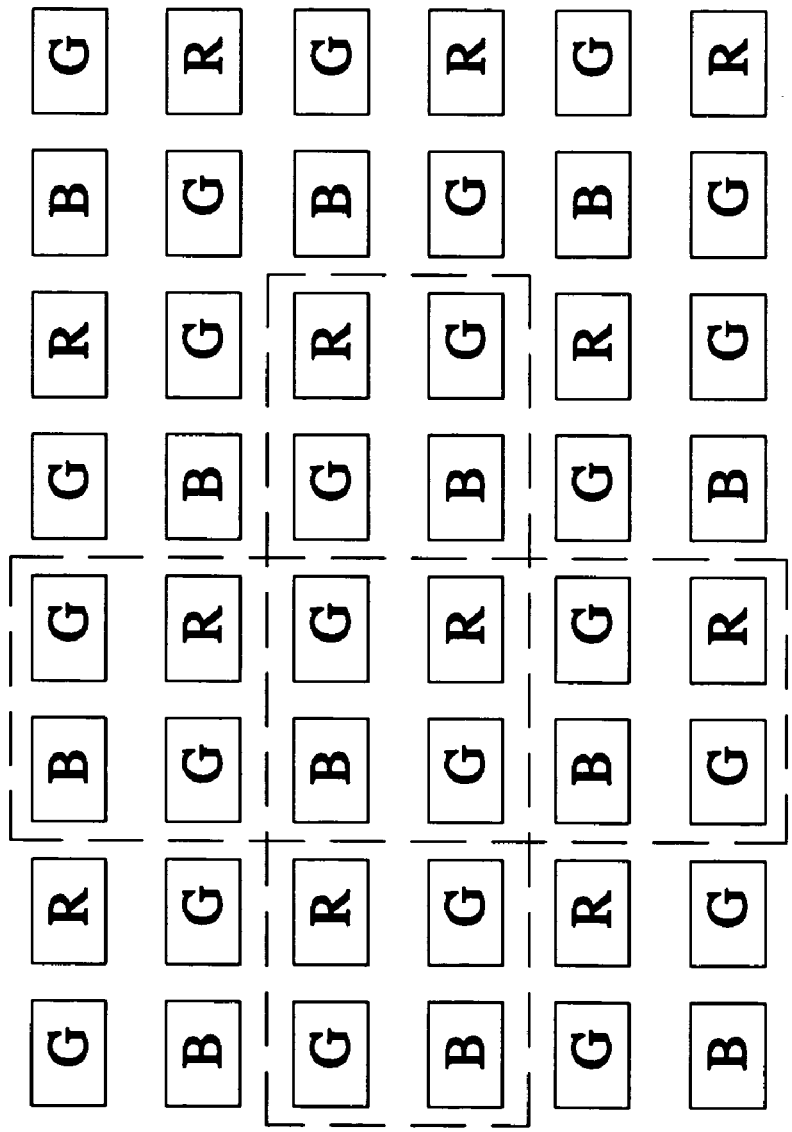
FIG. 6 is a schematic view of another conventional backlight module.

Referring to FIG. 4, an LED array 40 constructed according to a second preferred embodiment of the present invention is composed of a plurality of first light-emitting rows 41 and second light-emitting rows 51.

Each of the first light-emitting rows 41 includes a plurality of red LEDs R and green LEDs G The red LEDs R and green LEDs G are linearly alternately arranged. Each of the second light-emitting rows 51 includes a plurality of green LEDs G and blue LEDs B. The green LEDs G and blue LEDs B are linearly alternately arranged.

The first and the second light-emitting rows 41 and 51 are parallel to each other and arranged alternately. Between each adjacent first and second light-emitting rows 41 and 51, the red LEDs R of the first light-emitting row 41 are adjacent to the green LEDs G of the second light-emitting row 51 respectively, and the green LEDs G of the first light-emitting row 41 are adjacent to the red LEDs R of the second light-emitting row 51 respectively. In addition, a plurality of blue LEDs B are mounted between the first and second light-emitting rows 41 and 51. Each of the blue LEDs B is located among the red and green LEDs R and G of the first light-emitting row 41 and the green and red LEDs G and R of the second light-emitting row 51.

Therefore, each 2×2 matrix having the blue LED B includes two green LEDs G, two red LEDs R, and a blue LED B to result in alternate distribution of the green and red light and equable distribution of the blue light.

As indicated above, the present invention includes advantages as follows.

1. The present invention enables more equable light mixture and avoids colored light straps more effectively than the prior art.
2. Any 2×2 matrix of the present invention includes two green LEDs G, one red LED R, and one blue LED B, wherein the two green LEDs G are located cornerwise neither transversely nor longitudinally linearly adjacently to prevent the green LEDs G from generation of linear colored light straps.

The arrangements indicated in the previously mentioned embodiments and the present invention applied to the circuit boards are recited for example only but not to limit the scope of the claim of the present invention. Any other equal or interchangeable elements should be included in the claim of the present invention.

What is claimed is:

1. A light emitting diode (LED) array comprising:
a plurality of first light-emitting rows having a plurality of red and green LEDs, said red and green LEDs being linearly alternately arranged; and
a plurality of second light-emitting rows having a plurality of green and blue LEDs, said green and blue LEDs being linearly alternately arranged wherein between each said adjacent first and second light-emitting rows, said green LEDs of said first light-emitting row are adjacent to said blue LEDs of said second light-emitting row;
wherein said first light-emitting rows and said second light-emitting rows are parallel to each other and arranged alternately.

2. The LED array as defined in claim 1 further comprising a plurality of circuit boards, each of said circuit boards having at least one of said first light-emitting rows and at least one of said second light-emitting rows, said circuit boards being arranged in matrix.

3. The LED array as defined in claim 2, wherein each of said circuit boards comprises one said first light-emitting row and one said second light-emitting row.

4. The LED array as defined in claim 3, wherein said first and second light-emitting rows of each circuit board are adjacent to each other, each two of said LEDs of said first light-emitting row of each circuit board are closely arranged in pair, and each pair of said LEDs is spaced from the other in a predetermined interval; said first and second light-emitting rows of each circuit board are adjacent to each other, each two of said LEDs of said second light-emitting row of each circuit board are closely arranged in pair, and each pair of said LEDs is spaced from the other in a predetermined interval.

5. The LED array as defined in claim 4, wherein each pair of said LEDs of said first light-emitting row and each pair of said second light-emitting row together form a 2×2 matrix.

6. An LED array comprising:
a plurality of first light-emitting rows having a plurality of red and green LEDs, said red and green LEDs being linearly alternately arranged; and
a plurality of second light-emitting rows having a plurality of green and red LEDS, said green and red LEDs being linearly alternately arranged;
wherein said first and second light-emitting rows are parallel to each other and alternately arranged, a plurality of blue LEDs being mounted between each said adjacent first and second light-emitting rows, each of said blue LEDs being located among said red and green LEDs of said first light-emitting row and said red and green LEDs of said second light-emitting row.

7. The LED array as defined in claim 6, wherein between each said adjacent said first and second light-emitting rows, said red LED of said first light-emitting row is adjacent to said green LED of said second light-emitting row.

8. A light emitting diode (LED) array comprising:
a plurality of first light-emitting rows having a plurality of red and green LEDs, said red and green LEDs being linearly alternately arranged; and
a plurality of second light-emitting rows having a plurality of green and blue LEDs, said green and blue LEDs being linearly alternately arranged;
wherein said first light-emitting rows and said second light-emitting rows are parallel to each other and arranged alternately;
a plurality of circuit boards, each of said circuit boards having at least one of said first light-emitting rows and at least one of said second light-emitting rows, said circuit boards being arranged in matrix wherein each of said circuit boards comprises one said first light-emitting row and one said second light-emitting row.

* * * * *